(12) United States Patent
Tanaka et al.

(10) Patent No.: US 6,178,764 B1
(45) Date of Patent: Jan. 30, 2001

(54) AIR CONDITIONING SYSTEM

(75) Inventors: Toru Tanaka, deceased, late of Ihara, by Toshiaki Tanaka, executor; Teruhiko Kameoka, Okazaki; Koji Ito, Nagoya; Koji Matsunaga, Kariya, all of (JP)

(73) Assignee: Denso Corporation, Kariya (JP)

( * ) Notice: Under 35 U.S.C. 154(b), the term of this patent shall be extended for 0 days.

(21) Appl. No.: 09/281,579

(22) Filed: Mar. 30, 1999

(30) Foreign Application Priority Data

Mar. 31, 1998 (JP) .................................................. 10-086922

(51) Int. Cl.[7] ..................................................... F25D 19/00
(52) U.S. Cl. .................................. 62/296; 62/244; 62/239
(58) Field of Search ............................. 62/296, 244, 239

(56) References Cited

U.S. PATENT DOCUMENTS

| | | | |
|---|---|---|---|
| 2,236,111 | * | 3/1941 | Philipp ..................................... 62/296 |
| 2,989,855 | * | 6/1961 | Thompson ............................... 62/296 |
| 3,112,623 | * | 12/1963 | Crossman ................................ 62/296 |
| 3,200,609 | * | 8/1965 | Laing ....................................... 62/296 |
| 3,449,924 | * | 6/1969 | Sudmeier ................................. 62/296 |
| 3,524,328 | * | 8/1970 | Schuster .................................. 62/296 |
| 4,991,406 | * | 2/1991 | Fujii et al. .............................. 62/296 |

* cited by examiner

*Primary Examiner*—William Doerrler
*Assistant Examiner*—Mark Shulman
(74) *Attorney, Agent, or Firm*—Harness, Dickey & Pierce, PLC

(57) ABSTRACT

An air conditioning system suitable for automotive application is disclosed, in which the noise in the frequency range of about 1 kHz to 2 kHz is reduced. At least a sound absorbing member is arranged over the portions extending from a turning section of an air path where the air blown under pressure from a blower impinges and changes direction toward a heat exchanger, i.e. from the spiral end of a scroll casing to the front of an evaporator.

8 Claims, 8 Drawing Sheets

AIR CONDITIONING SYSTEM

BACKGROUND OF THE INVENTION

1. Field of the Invention

The present invention relates to an air conditioning system comprising a blower and a heat exchanger effectively used in an automotive.

2. Description of the Related Art

In recent years, what is called a "semicentral unit" has often been employed for reducing the size of an automotive air conditioning system. A semicentral unit comprises a blower arranged in front of the front passsenger seat, and heat exchangers such as an evaporator and a heat core are arranged longitudinally in the center console of an automotive vehicle (FIG. 1). As a result, the air sent under pressure from the blower turns about 90° at a point upstream of the evaporator and flows into the evaporator.

The semicentral unit can be reduced in size as compared with what is called the transverse unit comprising a blower, an evaporator and a heat core arranged along the transverse direction of the vehicle. Also, as compared with the transverse unit, the air path from the blower to the air outlet in the cabin is shortened, and therefore the pressure loss in the air path can be reduced.

In the semicentral unit having a shorter air path than the transverse unit, however, the noise generated in the blower propagates to the interior of the cabin from the air outlet in the cabin without being sufficiently attenuated in the air-conditioning system (air-conditioning casing), thereby leading to the problem of a larger noise than the transverse unit.

Experiments and study conducted by the inventors have confirmed that a noise of about 1 kHz to 2 kHz in frequency is generated most conspicuously in what is called the face blowout mode in which the length of the air path is shortest.

SUMMARY OF THE INVENTION

In view of the problems of the prior art described above, the object of the present invention is to reduce the noise of an air conditioning system in which the air flow is turned at a point upstream of a heat exchanger in the semicentral unit.

In order to achieve the above-mentioned object, the present invention employs the following technical means. After conducting various experiments and study, the inventors have discovered that in an air conditioning system comprising a turning section 7 for changing the direction of flow in the air path 40 at a point upstream of a heat exchanger 1, the noise sound wave generated in a blower 3 mainly impinges and is reflected on the inner wall of the turning section 7 and propagates toward the heat exchanger 1.

In view of this, according to claim 1 of the present invention, the turning section 7 for turning the air flow toward the heat exchanger 1 has arranged thereon at least a sound absorbing member 8 in the air conditioning casing 4.

As a result, the noise reflected on the inner wall of the turning section 7 can be effectively absorbed into, and attenuated by, the sound absorbing member 8.

The air conditioning system according to claim 2 assumes the employment of a blower of the centrifugal type, In the absence of the scroll casing 32 or the air conditioning casing 4, the sound wave of the noise generated in the centrifugal multi-blade fun 32 would propagate radially outward of the fan 32. In the case where the path structure (duct structure) is formed of the scroll casing 31 and the air casing 4 as in the present invention, however, the noise generated by the centrifugal multi-blade fan 32 impinges and is reflected on the inner wall 31a located outward as viewed radially of the scroll casing 31 and the wall of the path connected thereto and, together with the radial air flow generated in the scroll casing 31, propagates downstream of the air flow.

In view of this, according to claim 3, at least a sound absorbing member 8 is arranged at the spiral end 31b included in the inner wall 31a of the scroll casing 31.

In this way, the sound absorbing member 8 is arranged at the portion where the noise first impinges and is reflected, and therefore the noise can be positively absorbed and attenuated.

The inventors have conducted various experiments and study and have found that in the air conditioning system having a turning section 7 at a point upstream of the heat exchanger 1, the noise in a specific frequency range is liable to resonate in the neighborhood of the connecting duct 6.

To obviate this inconvenience, according to claim 4 hereof, at least a sound absorbing member 8 is arranged at that portion 6a of the connecting duct 6 for connecting the scroll casing 31 and the air conditioning case 4 which is connected to the inner wall 31a of the scroll casing 31.

As a result, the noise resonating in the neighborhood of the connecting duct 6 can be effectively absorbed and attenuated.

According to claim 5, on the other hand, at least a sound absorbing member 8 is arranged over the entire area of the turning section 7 formed in the portion of the inner wall 31a of the scroll casing 31 extending from the spiral end 31b of the scroll casing 31 to the points 6a, 4a connected therewith.

In all the cases mentioned above, the noise can be effectively absorbed and attenuated by the sound absorbing member 8 arranged on the turning section 7.

According to claim 6, the sound absorbing member 8 is accommodated in the internal space of each expansion 12 formed by being protruded from the wall surface of the turning section 7 outward of the air path 40.

In this way, the sectional area of the path of the blown air can be prevented from being reduced, and therefore the pressure loss in the ventilation system of the air conditioning system can be prevented from increasing and so the air flow rate can be prevented from being decreased.

According to claim 7, the portion of the wall of the air path 40 constituting the turning section 7 is formed with at least a through hole 9 passed therethrough, which through hole 9 is closed by the sound absorbing member 8 arranged outside of the casings 31a, 4.

As a result, as in claim 6, the air blow rate is prevented from being reduced, while at the same time causing the sound absorbing member 8 to effectively absorb and attenuate the sound wave of the noise.

According to claim 8, the air conditioning system of claim 7 further comprises air blocking means 11 for blocking the flow of the air through the sound absorbing member 8.

This prevents the air flow rate from being reduced (air leakage) which otherwise might be caused by the blown air which may pass through the sound absorbing member 8.

According to claim 9, on the other hand, the air conditioning system further comprises waterproofing means 13 for preventing the water from being absorbed into the sound absorbing member 8.

Since the water is prevented from being absorbed into the sound absorbing member 8, it is possible to prevent the reduction in the sound absorbing capacity of the sound absorbing member 8 and the generation of an offensive odor due to the decomposition of organic material in the water.

According to claim 10, an antiseptic treatment is performed on the sound absorbing member 8.

As a result, the generation of an offensive odor which otherwise might be caused by the decomposition of the water absorbed into the sound absorbing member 8 can be prevented. The reference characters attached to each means indicate the correspondence with the specific means included in the embodiments described below.

BRIEF DESCRIPTION OF THE DRAWINGS

The above and other objects, features and advantages will be made apparent by a detailed description taken in conjunction with the accompanying drawings, in which.

DESCRIPTION OF THE PREFERRED EMBODIMENTS

First embodiment

Figure 1:
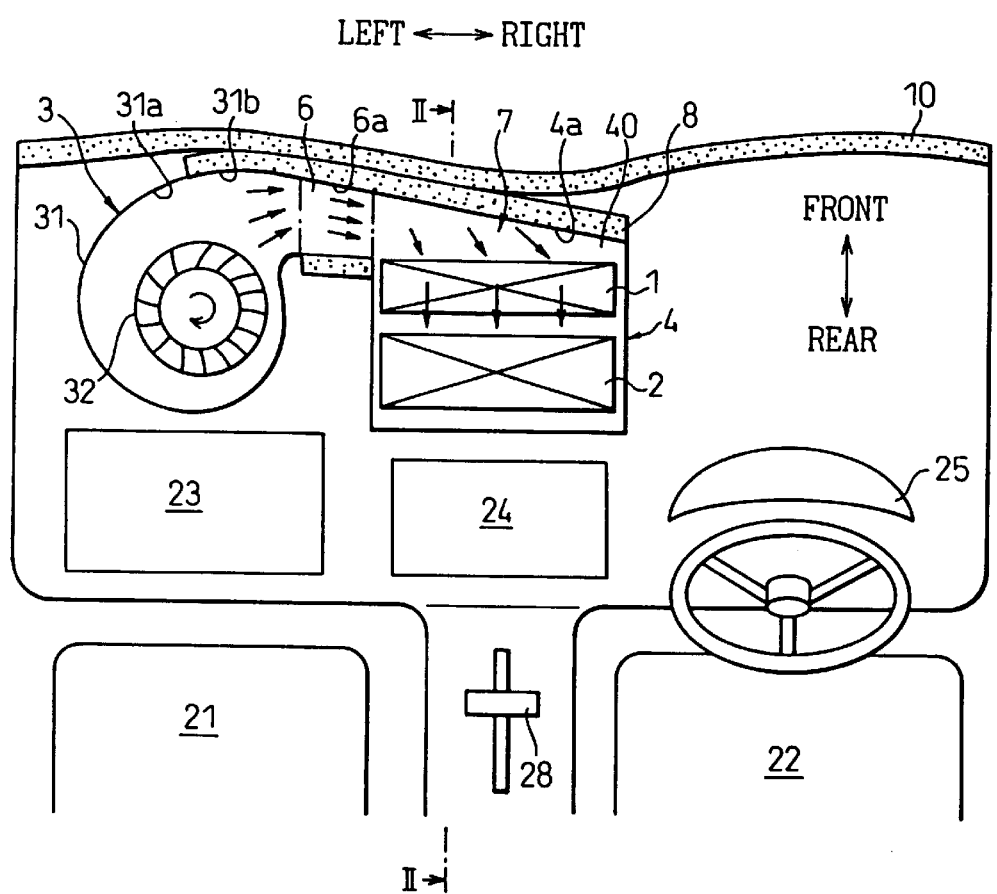
FIG. 1 is a diagram showing an air conditioning system for automotive applications.
Figure 3:
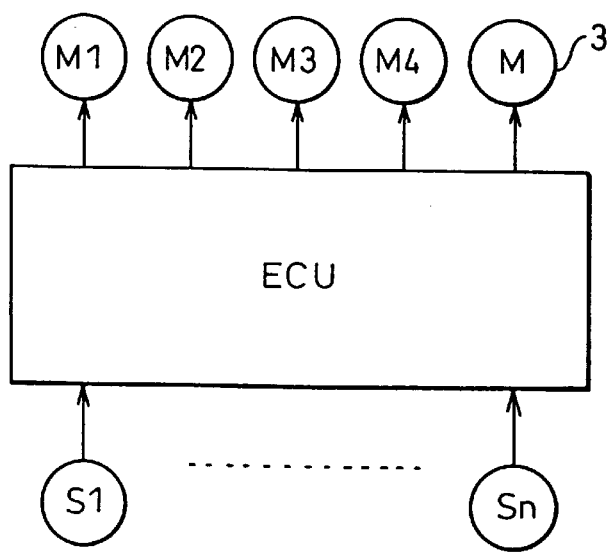
FIG. 3 is a block diagram showing a control system of an automotive air conditioning system.

This embodiment is an application of an air conditioning system, according to the invention, to an automotive air conditioning system having a semicentral unit. FIGS. 1 and 3 are diagrams showing the automotive air conditioning system according to this embodiment mounted on an automotive vehicle.

Figure 2:
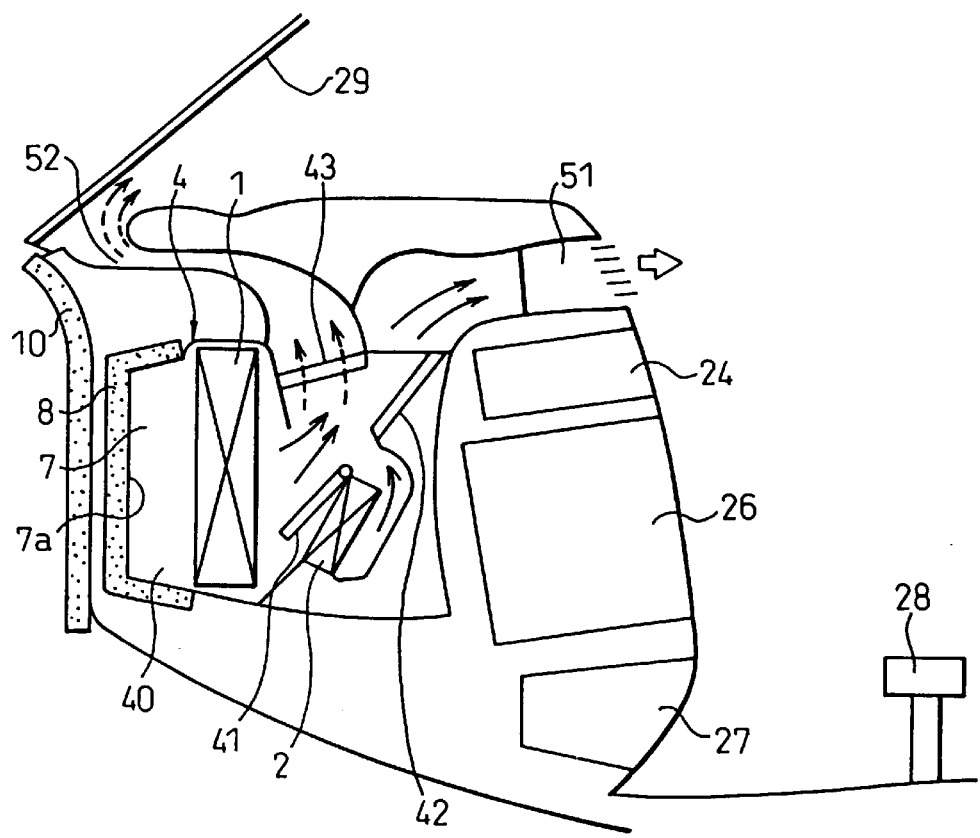
FIG. 2 is a sectional view taken in line II—II in FIG. 1.

In FIGS. 1 and 2, numeral 1 designates a cooling heat exchanger for cooling the air blown into the cabin. A heating heat exchanger 2 for heating the air blown into the cabin is arranged downstream of the cooling heat exchanger 1 along the flow of air.

According to this embodiment, the cooling heat exchanger 1 is a well-known vapor compression refrigeration cycle evaporator for cooling the air by the latent heat of vaporization of the refrigerant, and the heating heat exchanger 2 is a heater core using the cooling water of the vehicle-driving engine as a heat source. Hereinafter, therefore, the cooling heat exchanger 1 will be called the evaporator 1 and the heating heat exchanger 2 the heater core 2.

Numeral 3 designates a blower for blowing the air toward the evaporator 1 and the heater core 2. The blower 3 is of a well-known centrifugal type having a spiral scroll casing 31 and a centrifugal multi-blade fan 32. Numeral 4 designates an air conditioning casing for forming an air path 40 for leading the air blown from the blower 3 to the evaporator 1 on the one hand and accommodating the evaporator 1 and the heater 2 longitudinally in the vehicle, on the other hand.

An internal air entrance (not shown) for introducing the air from the cabin and an external air entrance (not shown) for introducing the air from outside the cabin are formed upstream of the blower 3 along the flow of air. These entrances are switched by an internal-external air switching damper (not shown).

The air conditioning casing 4 contains therein, as shown in FIG. 2, an air mix damper (blown air temperature adjust means) 41 for adjusting the temperature of the air blown into the cabin by adjusting the air flow rate circumventing the heat core 2, a face open/close damper 42 for opening/closing the path communicating with the face outlet 51 for blowing out the air toward the upper half of the body of an occupant, a defroster open/close damper 43 for opening/closing the path communicating with the defroster outlet 52 for blowing out the air toward the windshield, and a foot open/close door (not shown) for opening/closing the path communicating with the foot air outlet (not shown) for blowing out the air toward the feet of an occupant.

These dampers 41 and 43 (including the foot open/close damper) are controlled by an electronic control unit (ECU) through servo motors or the like drive means M1 to M4 as shown in FIG. 3. The ECU is supplied with signals from various air conditioning sensors S1 to Sn required for controlling the air conditioning factors including the room temperature, outdoor temperature, etc.

Also, a connecting duct 6 for connecting casings 31 and 4 extends transversely of the vehicle, as shown in FIG. 1, between a scroll casing 31 (blower 3) and an air conditioning casing 4. The blown air that has entered the air conditioning casing 4 from the left side (the front passenger seat side) through the connecting duct 6 is turned about 90° rearward of the vehicle (toward the evaporator 1 side) at a point upstream of the evaporator 1. The portion of the air conditioning casing 4 which changes the direction of the air flow will be called the turning section 7.

The connecting duct 6 and the casings 31, 4 are made of resin (polypropylene in this embodiment), and weld lines (or weld marks) are formed on those surfaces.

In FIG. 1, though not directly related to the invention, reference numeral 21 designates a driver's seat, numeral 22 the front passenger seat, numeral 23 a glove box, numeral 24 an operating panel for the air conditioning system and the audio equipment, numeral 25 meters, numeral 26 the body of the audio equipment, numeral 26 an ash tray, numeral 28 a shift lever, and numeral 29 a windshield.

The turning section 7, the connecting duct 6 and the casings 31, 4 have arranged therewith a sound absorbing member 8 of a porous elastic material for attenuating the noise (sound waves) generated by the blower 3. The position where the sound absorbing member 8 is arranged will be described in detail later.

Figure 4:
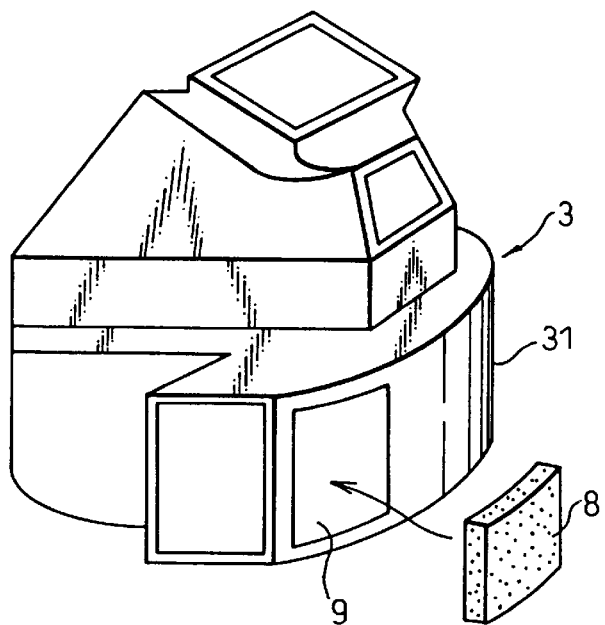
FIG. 4 is a perspective view showing a blower.
Figure 5:
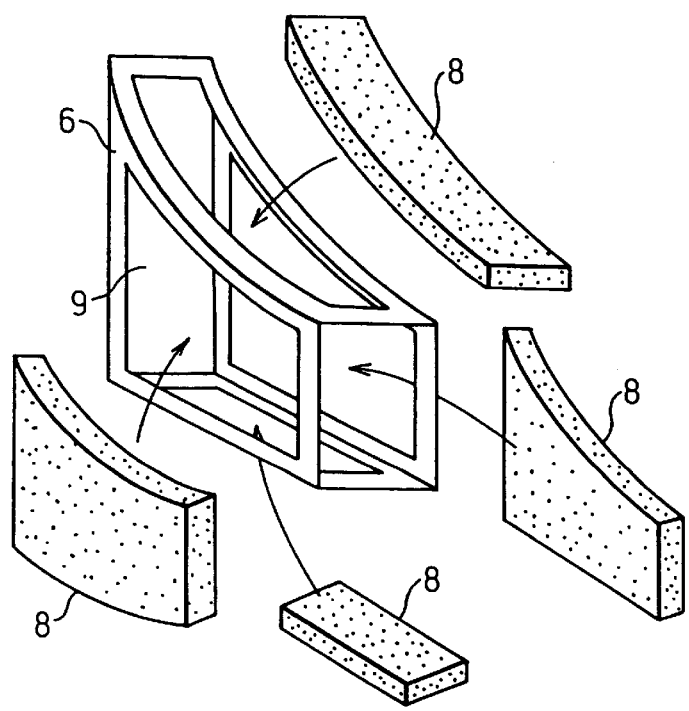
FIG. 5 is an exploded perspective view showing a connecting duct.
Figure 6A:
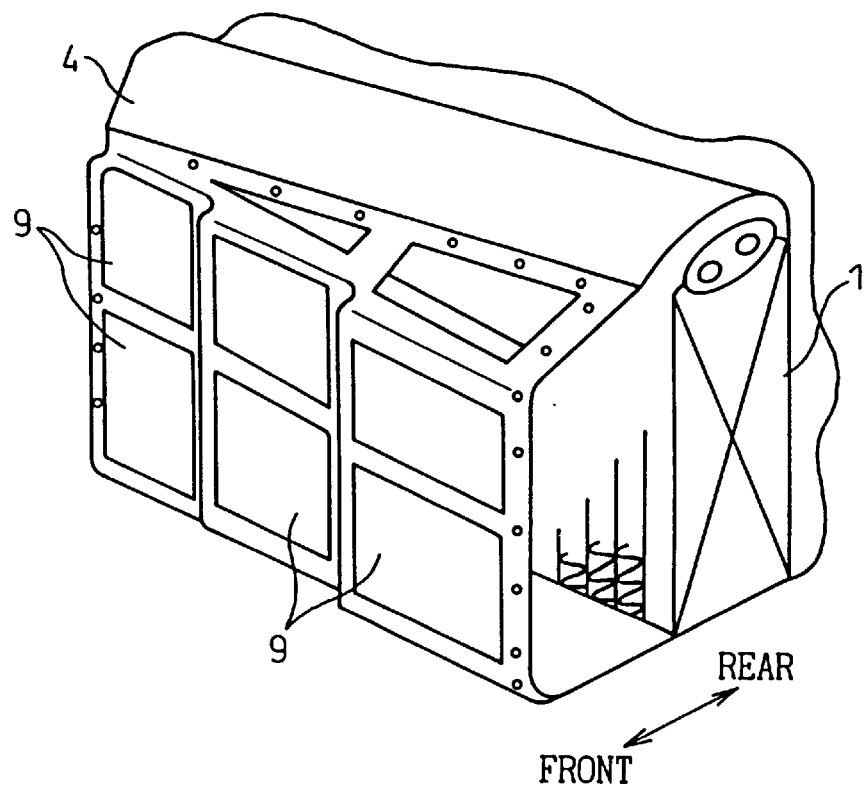
FIG. 6A is a perspective view of an air conditioning casing.
Figure 6B:
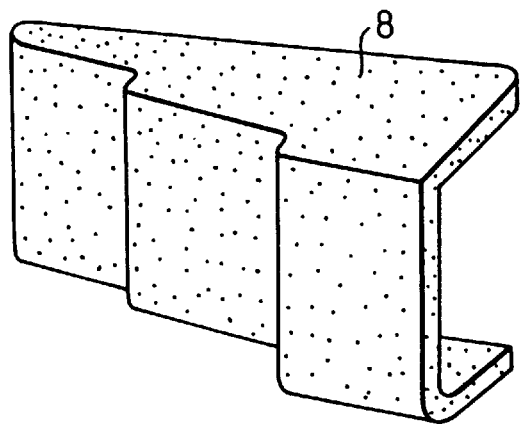
FIG. 6B is a perspective view of a sound absorbing member.

The portion of the casings 31, 4 and the connecting duct 6 where the sound absorbing member 8 is arranged, as shown in FIGS. 4 to 6, are formed with a plurality of through holes 9 passing through the casings 31, 4 and the connecting duct 6. Each through hole 9 is closed by the sound absorbing member 8 arranged on the outside of the casings 31, 4 and the connecting duct 6. FIG. 4 shows a case in which the scroll casing 31 is formed with the through holes 9 with the sound absorbing members 8 mounted thereon, and FIG. 5 shows a similar case for the connecting duct 6. FIGS. 6A, 6B show a case in which a common sound absorbing member 8 is mounted integrally for a plurality of through holes 9.

In FIG. 1, numeral 10 designates an insulator arranged on the dash panel partitioning the cabin and the engine room to prevent heat and sound entering the cabin from the engine room.

Figure 7A:
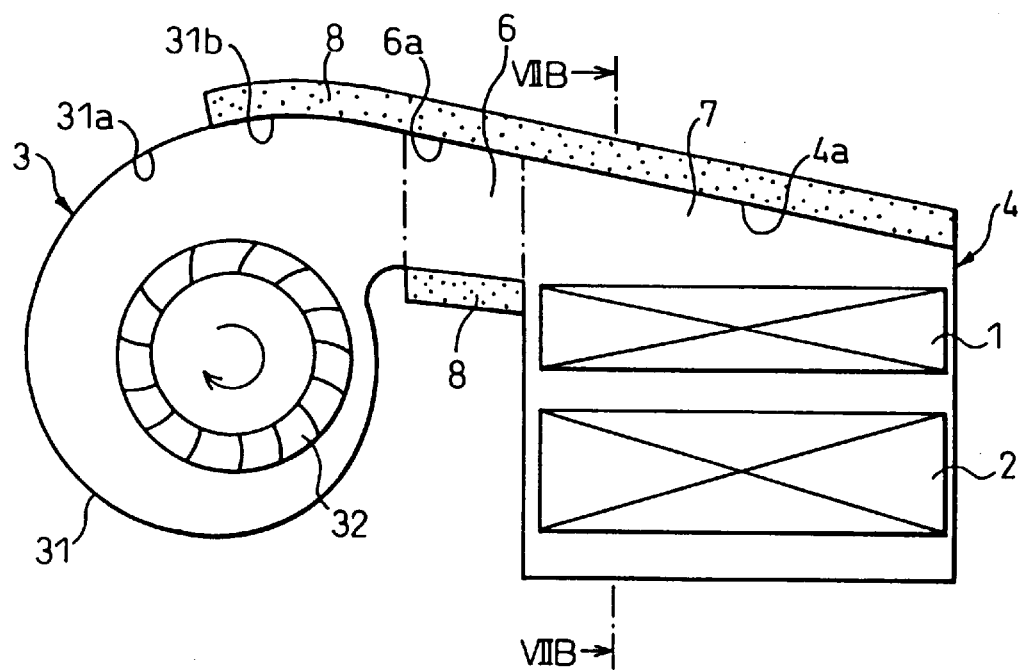
FIG. 7A is a model diagram showing an automotive air conditioning system.
Figure 7B:
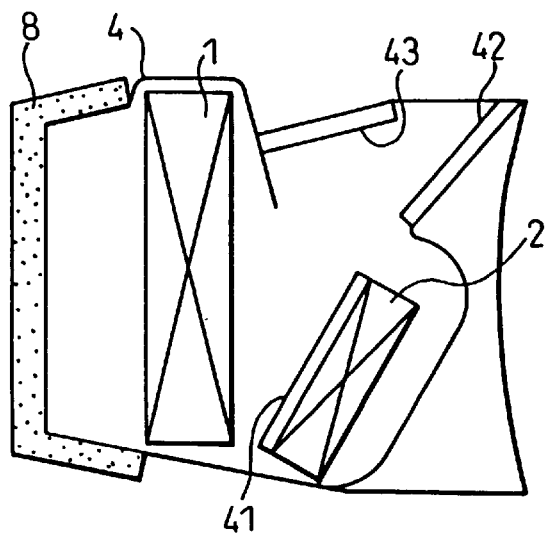
FIG. 7B is sectional view taken in line VIIB—VIIB in FIG. 7A.

Now, the positions at which the sound absorbing members 8 are arranged and the features thereof will be explained (FIGS. 7A, 7B).

The air blown out of the blower 3 flows radially outward due to the centrifugal force exerted by the multi-blade fan 32, and changes direction as it impinges on the inner wall of the air conditioning casing 4, in the turning section 7, located in front of the evaporator 1, i.e. the inner wall 4a connected to the inner wall 31a radially outward of the scroll casing 31. The noise (sound waves) generated from the blower 3, like the blown air, impinges and is reflected on the inner wall 4a and propagates toward the evaporator 1. The change in the direction of the noise by impinging is more conspicuous for sound waves having a high directivity and a comparatively high frequency of approximately 1 kHz to 2 kHz or higher.

By arranging the sound absorbing member 8 on the inner wall 4a of the turning section 7 as in the present embodiment, therefore, the noises in the frequency range of about 1 kHz to 2 kHz and other frequency ranges can be effectively absorbed and attenuated.

In the absence of the scroll casing 31 and the air conditioning casing 4, the noise generated by the centrifugal multi-blade fan 32 would propagate radially outward of the centrifugal multi-blade fan 32. In the case where the path structure (duct structure) is formed of the scroll casing 31 and the air conditioning casing 4 as in this embodiment, however, the noise generated by the centrifugal multi-blade fan 32 impinges on (is reflected by) the inner walls 31b, 6a, 4a connected to the inner wall 31a radially outward of the scroll casing 31 and propagates downstream along the air flow.

In view of this, according to the present embodiment, the sound absorbing members 8 are arranged over that portion of the radially outward inner wall 31a of the scroll casing 31 which extends from the spiral end 31b of the scroll casing 31 to the inner wall 4a of the turning section 7 through the inner wall 6a of the connecting duct 6. In this way, the noise can be positively absorbed and attenuated.

The inventors, after conducting various experiments and studies, have discovered that, in the automotive air conditioning system with a semicentral unit having the turning section 7 upstream of the evaporator 1, the noise of a specific frequency band (approximately 1 kHz to 2 kHz) is liable to resonate in the neighborhood of the connecting duct 6.

Based on this discovery, according to this embodiment, the sound absorbing members 8 are arranged over the whole periphery of the inner wall of the connecting duct 6. Therefore, the noise resonating in the neighborhood of about the connecting duct 6 can be effectively absorbed and attenuated.

Figure 8A:
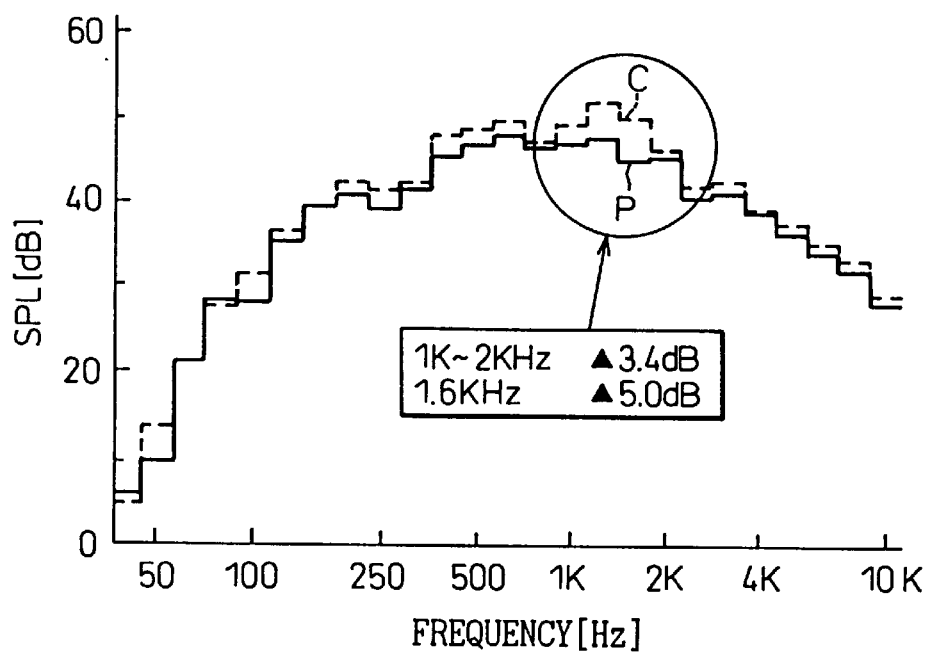
FIG. 8A is a graph showing the result of a noise measurement.
Figure 8B:
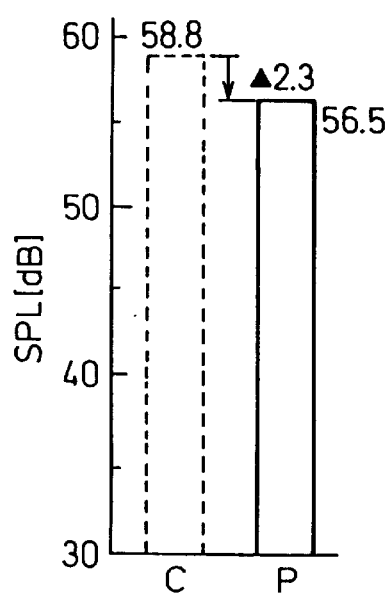
FIG. 8B is a bar graph showing summarizing the contents of FIG. 8A.

FIG. 8A shows the result of a noise test (solid line) conducted on the automotive air conditioning system according to this embodiment, in comparison with the result of the noise test (dashed line C) conducted with the sound absorbing member 8 removed from the automotive air conditioning system according to this embodiment. The abscissa represents the noise frequency, and the ordinate the noise level (dB). As clear from this diagram, the noise is reduced by 3.4 dB at 1 kHz to 2 kHz, by 5.0 dB at 1.6 kHz and by 2.3 dB overall, as shown in FIG. 8B. This noise test is based on JIS B8340.

According to this embodiment, the sound absorbing members 8 are arranged on the outside of the casings 31, 4 and the connecting duct 6, and therefore do not reduce the sectional area of the path of the blown air. Thus, the pressure loss of the ventilation system of the automotive air conditioning system can be prevented from increasing, thereby making it possible to prevent the air flow rate from decreasing.

Second embodiment

In the aforementioned embodiment, the through holes 9 are formed in the casings 31, 4 and the connecting duct 6 and the sound absorbing members 8 are arranged on the outside of the casings 31, 4 and the connecting duct 6 in such a manner as to close the through holes 9. As the blown air flows, therefore, the air may leak and the air blow rate at the outlet may decrease.

Figure 9:
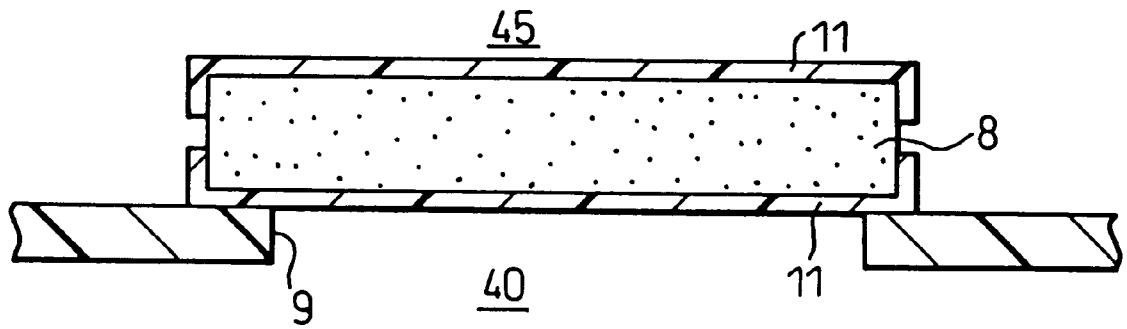
FIG. 9 is a sectional view showing the neighborhood of the sound absorbing member of an automotive air conditioning system according to a second embodiment.
Figure 10:
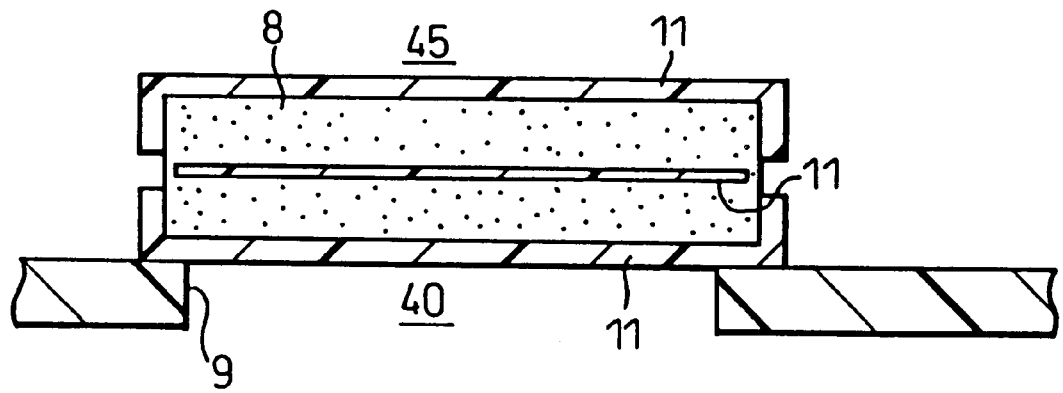
FIG. 10 is a sectional view of the neighborhood of the sound absorbing member of an automotive air conditioning system according to a modification of the second embodiment.

In view of this, according to this embodiment, thin films 11 of polyethylene are arranged on the inside or outside of the sound absorbing members 8 as shown in FIGS. 9 and 10 to stop the blown air passing through the sound absorbing members 8. In the diagram, numeral 45 designates the outside space as viewed from the air path 40.

According to the second embodiment, the thin films 11 constituting the air blocking means double as waterproofing means for preventing water from being absorbed into the sound absorbing members 8. As a result, the water such as the condensed water of the evaporator 1 and the rain water intruding from the air inlet is prevented from being absorbed into the sound absorbing members 8. It is thus possible to prevent the sound absorbing capacity of the sound absorbing members from decreasing and to prevent an offensive odor from being generated which otherwise might be generated by the decomposition of organic material in the water.

Third embodiment

Figure 11A:
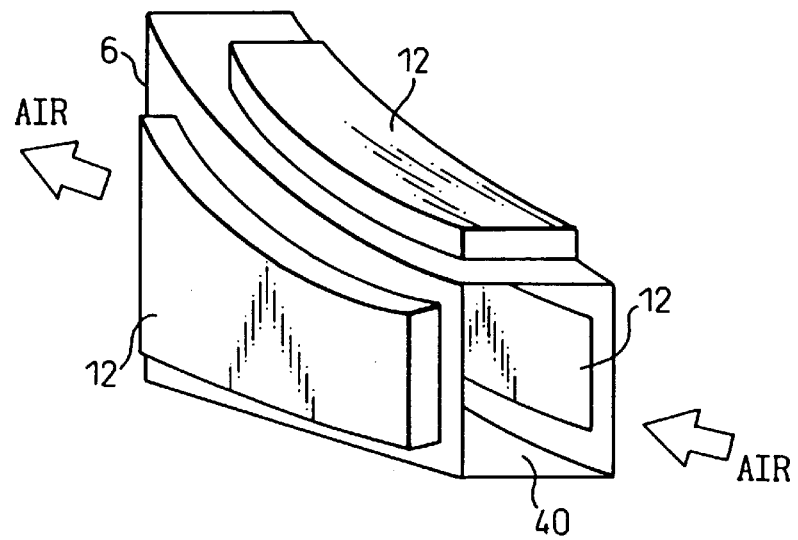
FIG. 11A is a perspective view of a connecting duct of an automotive air conditioning system according to the second embodiment.
Figure 11B:
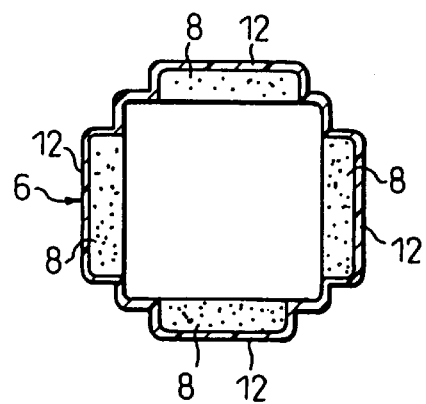
FIG. 11B is a sectional view of the connecting duct.
Figure 12:
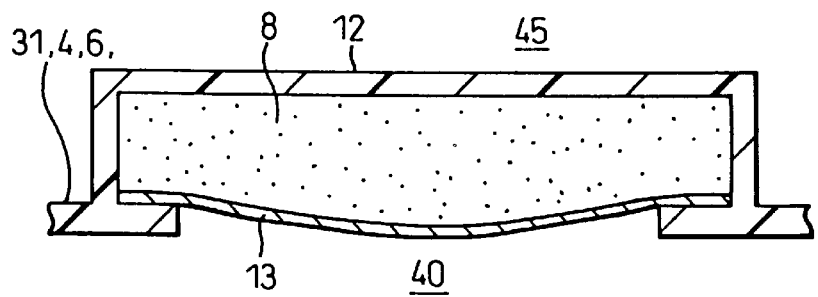
FIG. 12 is a sectional view of the neighborhood of the sound absorbing member of an automotive air conditioning system according to a third embodiment.

In each of the embodiments described above, the through holes 9 are formed in the casings 31, 4 and the connecting duct 6, and the sound absorbing members 8 are arranged on the outside of the casings 31, 4 and the connecting duct 6 in such a manner as to close the through holes 9. According to the third embodiment, in contrast, those portions of the wall surface of the casing 31, 4 and the connecting duct 6 where the sound absorbing members 8 are arranged are formed with expansions 12 protruding and expanding integrally with the sound absorbing members 8 outward of the air path 40 as shown in FIGS. 11 and 12, and the sound absorbing members 8 are accommodated within the expansions 12.

According to the third embodiment, therefore, the thin films 11 constituting the air blocking means can be done without. Numeral 13 designates a thin film constituting waterproofing means.

Other embodiments

In the second or third embodiment, the thin films 11 or 13 are used as waterproofing means. In place of the thin films 11, 13, however, the sound absorbing members 8 may be impregnated with a preservative or the surface of the sound absorbing members 8 may be coated with a preservative as an antiseptic treatment.

Also, in the embodiments described above, the sound absorbing member 8 are arranged over the whole periphery of the inner walls 31b, 6a, 4a connected to the inner wall 31a radially outward of the scroll casing 31. According to this present invention, however, the sound absorbing members 8 can be arranged on at least one of the inner walls 31b, 6a, 4a.

Further, the sound absorbing members 8 can be directly arranged on the inner wall of the casing 31, 4 or the connecting duct 6.

What is claimed is:

1. An air conditioning system comprising a heat exchanger (1), a blower (3) for blowing air under pressure to said heat exchanger (1), and an air conditioning casing (4) constituting at least a part of an air path (40) for leading the air blown under pressure from said blower (3) to said heat exchanger (1); wherein
    said blower (3) is a centrifugal type including a spiral scroll casing (31) and a multi-blade fan (32),
    a portion of said air path (40) upstream of said heat exchanger (1) is formed with a turning section (7) for causing the air flow to impinge thereon and change the direction thereof toward the heat exchanger (1), and
    a sound absorbing member (8) is arranged over the portions extending from a spiral end (31b) of an inner wall (31a) of said spiral scroll casing where the air flow generated in a radial direction in said scroll casing (31) impinges and changes direction, to an inner wall (4a) of said air conditioning casing (4) smoothly connected to the inner wall of said spiral end (31b).

2. An air conditioning system according to claim 1, wherein a connecting duct (6) is interposed between said scroll casing (31) and said air conditioning casing (4) for connecting them to each other, and said sound absorbing member (8) is arranged on the connecting portion (6a) of said connecting duct (6) for connecting to said inner wall (31a) of the scroll casing (31).

3. An air conditioning system according to claim 1, wherein the wall of said air path (40) where said turning section (7) is formed and said sound absorbing member (8) is to be arranged is formed with an expansion (12) expanding and protruding outward from the inner surface of said wall, and said sound absorbing member (8) is accommodated in said expansion (12).

4. An air conditioning system according to claim 1, wherein the wall of said air path (40) where said turning section (7) is formed and said sound absorbing member (8) is to be arranged is formed with at least a through hole passing through said wall, and said sound absorbing member (8) is mounted in said through hole (9) outside of the inner surface of said wall in such a manner as to close said through hole (9).

5. An air conditioning system according to claim 4, further comprising air blocking means (11) for blocking the air flow through said sound absorbing member (8).

6. An air conditioning system according to claim 1, further comprising waterproofing means (13) for preventing said sound absorbing member (8) from absorbing water.

7. An air conditioning system according to claim 1, wherein said sound absorbing member (8) is subjected to an antiseptic treatment.

8. An air conditioning system comprising:
    a heat exchanger;
    a blower for blowing air under pressure to said heat exchanger; and
    an air conditioning casing constituting at least a part of an air path for leading the air blown under pressure from said blower to said heat exchanger; wherein
    said blower is a centrifugal type blower including a spiral casing and multi-blade fan;
    a portion of said air path upstream of said heat exchanger is formed with a turning section having an inner wall for causing the air flow to impinge thereon and change the direction thereof toward the heat exchanger;
    a spiral end of an inner wall of said spiral casing forms a smooth transition to the inner wall of said turning section; and
    a sound absorbing member is located from the spiral end of the inner wall of the spiral casing to the inner wall of said air conditioning case.

* * * * *